United States Patent Office 2,989,393
Patented June 20, 1961

2,989,393
METHOD OF COMBATING WEEDS

Harry Tilles, El Cerrito, and Joe Antognini, Mountain View, Calif., assignors to Stauffer Chemical Company, a corporation of Delaware
No Drawing. Filed Oct. 13, 1958, Ser. No. 766,679
7 Claims. (Cl. 71—2.3)

This invention relates to certain novel mercapto esters of disubstituted thiolcarbamic acids as compositions of matter and as herbicides. The application is a continuation-in-part of application Serial No. 676,485, filed August 6, 1957, now abandoned.

More specifically, the invention relates to compounds of the general formula:

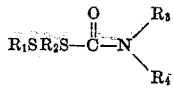

wherein $R_1$ is a lower alkyl radical, $R_2$ is a methylene radical or a lower polymethylene radical and $R_3$ and $R_4$ are two separate radicals including one or more alkyl radical, either straight or branched chain, cycloaliphatic radicals, alkylene radicals, substituted allyl radicals, or wherein $R_3$ and $R_4$ together comprise substituted or unsubstituted tetramethylene or pentamethylene groups, the terminal carbon atoms of which are bonded to the nitrogen atom.

The following compounds are typical of this group. Code numbers have been assigned to each compound and are used throughout the balance of the application.

*Example 1 (R–2264).*—A 500 cc. 4 neck flask was provided with stirrer, thermometer, condenser and gas inlet tube; a solution of 14.6 g. (0.20 mol) of diethylamine and 20.2 g. (0.20 mol) of triethylamine in 150 cc. of petroleum ether, B.P. 30–60° C., was charged to the flask and then 12 g. (0.20 mol) of carbonyl sulfide was bubbled into the amine solution with rapid stirring. It required 9 minutes to complete the addition and the temperature was maintained at 23–32.5° C. with cooling. The reaction mixture was then cooled to 4° C. and 19.3 g. (0.20 mol) of chlorodimethyl sulfide was added dropwise over 6 minutes, maintaining the temperature between 4–7° C. with ice cooling. (In subsequent experiments, it was found that it was unecessary to cool the reaction mixture during the addition, and the addition of the chlorodimethyl sulfide was usually begun between a temperature range of 15–25° C. and no cooling was employed.) The cooling was then removed and the temperature rose to 27° C. during the next 19 minutes. The mixture was then heated to reflux during the next 24 minutes and then cooled to room temperature. The solid amine hydrochloride was removed by filtration and the cake was washed with 2–50 cc. portions of petroleum ether. The combined filtrate was concentrated on the steam bath. The residual liquid was then fractionally distilled through an 18″ Podbielniak Heli-Grid Fractional Distillation Column. There was obtained 16.5 g. (42.8% yield) of methylmercaptomethyl N,N-diethylthiolcarbamate, B.P. (10 mm.) 140–141.5° C., $n_D^{30}$ 1.5265.

| $R_1SR_2$ | $R_3$ | $R_4$ | Code |
|---|---|---|---|
| $CH_3SCH_2$ | $C_2H_5$ | $C_2H_5$ | (R–2264) |
| $CH_3SCH_2$ | n—$C_3H_7$ | n—$C_3H_7$ | (R–2265) |
| $CH_3SCH_2$ | $CH_3$ | n—$C_4H_9$ | (R–2266) |
| $CH_3SCH_2$ | $C_2H_5$ | n—$C_4H_9$ | (R–2267) |
| $CH_3SCH_2$ | $C_2H_5$ | cyclohexyl | (R–2296) |
| $CH_3SCH_2$ | $CH_2$=$CHCH_2$ | $CH_2$=$CHCH_2$ | (R–2323) |
| $CH_3SCH_2$ | $CH_2$=$CHCH_2$ | $C_2H_5$ | (R–2324) |
| $CH_3SCH_2$ | $CH_2$=$CHCH_2$ | n—$C_3H_7$ | (R–2326) |
| $CH_3SCH_2$ | $CH_2$=$CHCH_2$ | i—$C_3H_7$ | (R–2328) |
| $CH_3SCH_2$ | $CH_2$=$CHCH_2$ | n—$C_4H_9$ | (R–2329) |
| $CH_3SCH_2$ | $CH_2$=$CHCH_2$ | i—$C_4H_9$ | (R–2330) |
| $CH_3SCH_2$ | $CH_2$=$C(CH_3)CH_2$ | n—$C_3H_7$ | (R–2333) |
| $CH_3SCH_2$ | $CH_2$=$C(CH_3)CH_2$ | $C_2H_5$ | (R–2336) |
| $CH_3SCH_2$ | $CH_2$=$C(CH_3)CH_2$ | $CH_2$=$CHCH_2$ | (R–2337) |
| $CH_3SCH_2$ | $CH_2$=$CClCH_2$ | n—$C_3H_7$ | (R–2338) |
| $CH_3SCH_2$ | $CH_2$=$CClCH_2$ | $CH_2$=$CHCH_2$ | (R–2339) |
| $CH_3SCH_2$ | n—$C_4H_9$ | n—$C_4H_9$ | (R–2340) |
| $CH_3SCH_2$ | i—$C_4H_9$ | i—$C_4H_9$ | (R–2341) |
| $CH_3SCH_2$ | $ClCH$=$CHCH_2$ | n—$C_3H_7$ | (R–2342) |
| $CH_3SCH_2$ | $ClCH$=$CHCH_2$ | $CH_2$=$CHCH_2$ | (R–2343) |
| $CH_3SCH_2$ | $ClCH$=$CHCH_2$ | $C_2H_5$ | (R–2344) |
| $CH_3SCH_2$ | —$(CH_2)_5$— | | (R–2345) |
| $CH_3SCH_2$ | —$CH_2(CH_3)CH_2CH_2CH_2CH_2$— | | (R–2346) |
| $CH_3SCH_2$ | —$(CH_2)_4$— | | (R–2347) |
| $C_2H_5SCH_2$ | $C_2H_5$ | $C_2H_5$ | (R–2816) |
| $C_2H_5SCH_2$ | n—$C_3H_7$ | n—$C_3H_7$ | (R–2821) |
| $C_2H_5SCH_2$ | n—$C_4H_9$ | $CH_3$ | (R–2838) |
| $C_2H_5SCH_2$ | n—$C_4H_9$ | $C_2H_5$ | (R–2823) |
| $C_2H_5SCH_2$ | $CH_2$=$CHCH_2$ | $CH_2$=$CHCH_2$ | (R–2824) |
| $C_2H_5SCH_2$ | n—$C_3H_7$ | $CH_2$=$CHCH_2$ | (R–2826) |
| $C_2H_5SCH_2$ | $CH_2$=$C(CH_3)CH_2$ | $C_2H_5$ | (R–2829) |
| $C_2H_5SCH_2$ | $CH_2$=$C(CH_3)CH_2$ | $CH_2$=$CHCH_2$ | (R–2832) |
| $C_2H_5SCH_2$ | $ClCH$=$CHCH_2$ | $C_2H_5$ | (R–2837) |
| $C_2H_5SCH_2$ | —$CHCH_2CH_2CH_2CH_2$— $\mid$ $CH_3$ | | (R–2843) |
| $C_2H_5SCH_2$ | Cyclohexyl | $C_2H_5$ | (R–2844) |
| $CH_3SCH_2CH_2$ | $C_2H_5$ | $C_2H_5$ | (R–2850) |
| $CH_3SCH_2CH_2$ | n—$C_4H_9$ | $C_2H_5$ | (R–2854) |
| $CH_3SCH_2CH_2$ | $CH_2$=$CHCH_2$ | $CH_2$=$CHCH_2$ | (R–2855) |
| $CH_3SCH_2CH_2$ | n—$C_3H_7$ | $CH_2$=$CHCH_2$ | (R–2857) |

The novel compounds of the present invention may be made in accordance with the following non-limiting examples.

*Analysis.*—Calculated for $C_7H_{15}NOS_2$: N=7.25%. Found: N=7.17%.

In the following examples, the carbonyl sulfide was added to the amine solution within a temperature range of 15–30° C.

*Example II (R-2265).*—The general procedure of Example I was repeated except that 30.3 g. (0.30 mol) of di-n-propylamine, 25 g. (0.42 mol) of carbonyl sulfide, 30.3 g. (0.30 mol) of triethylamine, 29.0 g. (0.30 mol) of chlorodimethyl sulfide and 200 cc. of petroleum ether, B.P. 30–60° C. solvent were employed. Instead of filtering the final reaction mixture, it was washed successively with 2–50 cc. portions of water, 2–50 cc. portions of dilute hydrochloric acid (5 cc. of concentrated hydrochloric acid made up to a volume of 50 cc. with water) and 2–50 cc. portions of water. The organic phase was then dried over anhydrous magnesium sulfate, filtered, and the filtrate was concentrated on the steam bath. The residual liquid was then fractionally distilled. There was obtained 47.0 g. (71% yield) of methylmercaptomethyl N,N-di-n-propylthiolcarbamate, B.P. (4.5 mm.) 136.0–137.5° C., $n_D^{30}$ 1.5157.

*Analysis.*—Calculated for $C_9H_{19}NOS_2$: N=6.34%. Found: N=6.20%.

*Example III (R-2266).*—When the general procedure of Example II was repeated except that 26.1 g. (0.30 mol) of N-methyl-n-butylamine, 30.3 g. (0.30 mol) of triethylamine, 25 g. (0.42 mol) of carbonyl sulfide, 29.0 g. (0.30 mol) of chlorodimethyl sulfide and 200 cc. of petroleum ether solvent were employed, there was obtained 45.1 g. (72.5% yield) of methylmercaptomethyl N-methyl-N-n-butylthiolcarbamate, B.P. (4.5 mm.) 136–137° C., $n_D^{30}$ 1.5212.

*Analysis.*—Calculated for $C_8H_{17}NOS_2$: N=6.76%. Found: N=6.79%.

*Example IV (R-2267).*—When the general procedure of Example II was repeated except that 30.3 g. (0.30 mol) of N-ethyl-n-butylamine, 30.3 g. (0.30 mol) of triethylamine, 25 g. (0.42 mol) of carbonyl sulfide, 29.0 g. (0.30 mol) of chlorodimethyl sulfide and 200 cc. of petroleum ether solvent were employed, there was obtained 42.6 g. (64.3% yield) of methylmercaptomethyl N-ethyl-N-n-butylthiolcarbamate, B.P. (4.5 mm.) 140–140.5° C., $n_D^{30}$ 1.5155.

*Analysis.*—Calculated for $C_9H_{19}NOS_2$: N=6.33%. Found: N=6.23%.

*Example V (R-2296).*—When the general procedure of Example II was repeated except that 38.1 g. (0.30 mol) of N-ethylcyclohexylamine, 30.3 g. (0.30 mol) of triethylamine, 25 g. (0.42 mol) of carbonyl sulfide, 29.0 g. (0.30 mol) of chlorodimethyl sulfide and 200 cc. of petroleum ether solvent were employed, there was obtained 29.6 g. (40.6% yield) of methylmercaptomethyl N-ethyl-N-cyclohexylthiolcarbamate, B.P. (4.5 mm.) 171.5–188° C., $n_D^{30}$ 1.5405.

*Analysis.*—Calculated for $C_{11}H_{21}NOS_2$: N=5.66%. Found: N=5.53%.

*Example VI (R-2323).*—When the general procedure of Example II was repeated except that 29.1 g. (0.30 mol) of diallylamine, 30.3 g. (0.30 mol) of triethylamine, 25 g. (0.42 mol) of carbonyl sulfide, 29.0 g. (0.30 mol) of chlorodimethyl sulfide and 200 cc. of petroleum ether solvent were employed, there was obtained 39.8 g. (61.0% yield) of methylmercaptomethyl N,N-diallylthiolcarbamate, B.P. (4.5 mm.) 139.0–139.5% C., $n_D^{30}$ 1.5405.

*Analysis.*—Calculated for $C_9H_{15}NOS_2$: N=6.44%. Found: N=6.26%.

*Example VII (R-2324).*—When the general procedure of Example II was repeated except that 8.5 g. (0.10 mol) of N-allylethylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 10.0 g. (48.8% yield) of methylmercaptomethyl N-allyl-N-ethylthiolcarbamate, B.P. (4.5 mm.) 131–132° C., $n_D^{30}$ 1.5344.

*Analysis.*—Calculated for $C_8H_{15}NOS_2$: N=6.81%. Found: N=6.60%.

*Example VIII (R-2326).*—When the general procedure of Example II was repeated except that 9.9 g. (0.10 mol) of N-allyl-n-propylamine, 10.1 g. (0.10 mol) of triethylamine, 10 g. (0.10 mol) of carbonyl sulfide, 9.7 g. (0.10 mol) of chlorodimethyl sulfide and 150 cc. of petroleum ether solvent were employed, there was obtained 8.5 g. (38.8% yield) of methylmercaptomethyl N-allyl-N-n-propylthiolcarbamate, B.P. (4.5 mm.) 140.5–141.0° C., $n_D^{30}$ 1.5280.

*Analysis.*—Calculated for $C_9H_{17}NOS_2$: N=6.38%. Found: N=6.28%.

*Example IX (R-2328).*—When the general procedure of Example II was repeated except that 9.9 g. (0.10 mol) of N-allyl-i-propylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 2.9 g. (13.4% yield) of methylmercaptomethyl N-allyl-N-i-propylthiolcarbamate, B.P. (4.5 mm.) 135–136° C., $n_D^{30}$ 1.5301.

*Analysis.*—Calculated for $C_9H_{17}NOS_2$: N=6.38%. Found: N=6.60%.

*Example X (R-2329).*—When the general procedure of Example II was repeated except that 11.3 g. (0.10 mol) of N-allyl-n-butylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 11.0 g. (47.2% yield) of methylmercaptomethyl N-allyl-N-n-butylthiolcarbamate, B.P. (4.5 mm.) 148.5–150.5° C., $n_D^{30}$ 1.5227.

*Analysis.*—Calculated for $C_{10}H_{19}NOS_2$: N=6.00%. Found: N=6.01%.

*Example XI (R-2330).*—When the general procedure of Example II was repeated except that 11.3 g. (0.10 mol) of N-allyl-i-butylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 8.6 g. (37.0% yield) of methylmercaptomethyl N-allyl-N-i-butylthiolcarbamate, B.P. (4.5 mm.) 142–145° C., $n_D^{30}$ 1.5215.

*Analysis.*—Calculated for $C_{10}H_{19}NOS_2$: N=6.00%. Found: N=5.85%.

*Example XII (R-2333).*—When the general procedure of Example II was repeated except that 11.3 g. (0.10 mol) of N-methallyl-n-propylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 9.1 g. (38.9% yield) of methylmercaptomethyl N-methallyl-N-n-propylthiolcarbamate, B.P. (4.5 mm.) 144.0–144.5° C., $n_D^{30}$ 1.5239.

*Analysis.*—Calculated for $C_{10}H_{19}NOS_2$: N=6.00%. Found: N=5.95%.

*Example XIII (R-2336).*—When the general procedure of Example II was repeated except that 9.9 g. (0.10 mol) of N-methallylethylamine, 10.1 g. (0.10 mol) of triethylamine, 10 g. (0.17 mol) of carbonyl sulfide, 9.7 g. (0.10 mol) of chlorodimethyl sulfide and 150 cc. of petroleum ether solvent were employed, there was obtained 9.7 g. (44.4% yield) of methylmercaptomethyl N-methallyl-N-ethylthiolcarbamate, B.P. (4.5 mm.) 136–137° C., $n_D^{30}$ 1.5298.

*Analysis.*—Calculated for $C_9H_{17}NOS_2$: N=6.40%. Found: N=6.23%,

*Example XIV (R-2337).*—The general procedure of Example II was repeated except that 11.1 g. (0.10 mol) of N-methallylallylamine, 10.1 g. (0.10 mol) of triethylamine, 10 g. (0.17 mol) of carbonyl sulfide, 9.7 g. (0.10 mol) of chlorodimethyl sulfide and 150 cc. of tert. butyl alcohol solvent were employed. After completion of the reaction, 125 cc. of solvent was distilled, the residual slurry was cooled to room temperature, diluted with 200 cc. of petroleum ether, B.P. 30–60° C. and the mixture was then worked up in the same manner as Example II. There was obtained 17.2 g. (74.5% yield) of methylmercaptomethyl N-methallyl-N-allylthiolcarbamate, B.P. (4.5 mm.) 144.5–145.5° C., $n_D^{30}$ 1.5353.

*Analysis.*—Calculated for $C_{10}H_{17}NOS_2$: N=6.06%. Found: N=5.84%.

*Example XV (R-2338).*—When the general procedure of Example XIV was repeated except that 13.4 g. (0.10 mol) of N-2-chloroallyl-n-propylamine, 10.1 g. (0.10 mol) of triethylamine, 12.5 g. (0.21 mol) of carbonyl sulfide, 9.7 g. (0.10 mol) of chlorodimethyl sulfide and 150 cc. of tert. butyl alcohol were employed, there was obtained 18.4 g. (72.5% yield) of methylmercaptomethyl N-2-chloroallyl-N-n-propylthiolcarbamate, B.P. (4.5 mm.) 158.5–160.5° C., $n_D^{30}$ 1.5383.

*Analysis.*—Calculated for $C_9H_{16}NOS_2Cl$: N=5.51%. Found: N=5.46%.

*Example XVI (R-2339).*—When the general procedure of Example XIV was repeated except that 13.2 g. (0.10 mol) of N-2-chloroallylallylamine, 10.1 g. (0.10 mol) of triethylamine, 10 g. (0.10 mol) of carbonyl sulfide, 9.7 g. (0.10 mol) of chlorodimethyl sulfide and 150 cc. of tert. butyl alcohol were employed, there was obtained 17.3 g. (68.5% yield) of methylmercaptomethyl N-2-chloroallyl-N-allylthiolcarbamate, B.P. (4.5 mm.) 159–160° C., $n_D^{30}$ 1.5503.

*Analysis.*—Calculated for $C_9H_{14}NOS_2Cl$: N=5.55%. Found: N=5.38%.

*Example XVII (R-2340).*—When the general procedure of Example XIV was repeated except that 12.9 g. (0.10 mol) of di-n-butylamine, 10.1 g. (0.10 mol) of triethylamine, 10 g. (0.17 mol) of carbonyl sulfide, 9.7 g. (0.10 mol) of chlorodimethyl sulfide and 150 cc. of tert. butyl alcohol were employed, there was obtained 17.8 g. (71.3% yield) of methylmercaptomethyl N,N-di-n-butylthiolcarbamate, B.P. (4.5 mm.) 157.5–158.5° C., $n_D^{30}$ 1.5078.

*Analysis.*—Calculated for $C_{11}H_{23}NOS_2$: N=5.61%. Found: N=5.41%.

*Example XVIII (R-2341).*—When the general procedure of Example XIV was repeated except that 25.8 g. (0.20 mol) of di-isobutylamine, 20.2 g. (0.20 mol) of triethylamine, 17 g. (0.28 mol) of carbonyl sulfide, 19.3 g. (0.20 mol) of chlorodimethyl sulfide and 150 cc. of tert. butyl alcohol were employed, there was obtained 38.9 g. (78.1% yield) of methylmercaptomethyl, N,N-di-isobutylthiolcarbamate, B.P. (4.5 mm.) 143–145° C., $n_D^{30}$ 1.5059.

*Analysis.*—Calculated for $C_{11}H_{23}NOS_2$: N=5.61%. Found: N=5.54%.

*Example XIX (R-2342).*—When the general procedure of Example XIV was repeated except that 13.4 g. (0.10 mol) of N-3-chloroallyl-n-propylamine, 10.1 g. (0.10 mol) of triethylamine, 10 g. (0.17 mol) of carbonyl sulfide, 9.7 g. (0.10 mol) of chlorodimethyl sulfide and 150 cc. of tert. butyl alcohol were employed, there was obtained 14.7 g. (57.8% yield) of methylmercaptomethyl N-3-chloroallyl-N-n-propylthiolcarbamate, B.P. (4.5 mm.) 166.2–169° C., $n_D^{30}$ 1.5432.

*Analysis.*—Calculated for $C_9H_{16}NOS_2Cl$: N=5.51%. Found: N=5.35%.

*Example XX (R-2343).*—When the general procedure of Example XIV was repeated except that 13.2 g. (0.10 mol) of N-3-chloroallylallylamine, 10.1 g. (0.10 mol) of triethylamine, 10 g. (0.17 mol) of carbonyl sulfide, 9.7 g. (0.10 mol) of chlorodimethyl sulfide and 150 cc. of tert. butyl alcohol were employed, there was obtained 13.0 g. (51.5% yield) of methylmercaptomethyl N-3-chloroallyl-N-allylthiolcarbamate, B.P. (4.5 mm.) 166–169° C., $n_D^{30}$ 1.5560.

*Analysis.*—Calculated for $C_9H_{14}NOS_2Cl$: N=5.56%. Found: N=5.33%.

*Example XXI (R-2344).*—When the general procedure of Example XIV was repeated except that 12.0 g. (0.10 mol) of N-3-chloroallylethylamine, 10.1 g. (0.10 mol) of triethylamine, 10 g. (0.17 mol) of carbonyl sulfide, 9.7 g. (0.10 mol) of chlorodimethyl sulfide and 150 cc. of tert. butyl alcohol were employed, there was obtained 14.7 g. (61.1% yield) of methylmercaptomethyl N-3-chloroallyl-N-ethylthiolcarbamate, B.P. (4.5 mm.) 164.8–168° C., $n_D^{30}$ 1.5505.

*Analysis.*—Calculated for $C_8H_{14}NOS_2Cl$: N=5.84%. Found: N=5.82%.

*Example XXII (R-2345).*—When the general procedure of Example XIV was repeated except that 17.0 g. (0.20 mol) of piperidine, 20.2 g. (0.20 mol) of triethylamine, 16 g. (0.27 mol) of carbonyl sulfide, 19.3 g. (0.20 mol) of chlorodimethyl sulfide and 150 cc. of tert. butyl alcohol were employed, there was obtained 27.3 g. (66.5% yield) of methylmercaptomethyl 1-piperidinecarbothiolate, B.P. (4.5 mm.) 152.5–153.5° C., $n_D^{30}$ 1.5578.

*Analysis.*—Calculated for $C_8H_{15}NOS_2$: N=6.81%. Found: N=7.04%.

*Example XXIII (R-2346).*—When the general procedure of Example XIV was repeated except that 19.8 g. (0.20 mol) of 2-methylpiperidine, 20.2 g. (0.20 mol) of triethylamine, 16 g. (0.27 mol) of carbonyl sulfide, 19.3 g. (0.20 mol) of chlorodimethyl sulfide and 150 cc. of tert. butyl alcohol were employed, there was obtained 24.8 g. (56.6% yield) of methylmercaptomethyl 1-(2-methyl) piperidinecarbothiolate, B.P. (4.5 mm.) 155.5–156.5° C., $n_D^{30}$ 1.5515.

*Analysis.*—Calculated for $C_9H_{17}NOS_2$: N=6.37%. Found: N=6.59%.

*Example XXIV (R-2347).*—When the general procedure of Example XIV was repeated except that 14.2 g. (0.20 mol) of pyrrolidine, 20.2 g. (0.20 mol) of triethylamine, 17 g. (0.28 mol) of carbonyl sulfide, 19.3 g. (0.20 mol) of chlorodimethyl sulfide and 150 cc. of tert. butyl alcohol were employed, there was obtained 25.4 g. (66.3% yield) of methylmercaptomethyl 1-pyrrolidinecarbothiolate, B.P. (4.5 mm.) 153.5–154.0° C., $n_D^{30}$ 1.56.19.

*Analysis.*—Calculated for $C_7H_{13}NOS_2$: N=7.31%. Found: N=7.42%.

*Example XXV (R-2816).*—When the general procedure of Example XIV was repeated except that 20.5 g. (0.28 mol) of diethylamine, 28.3 g. (0.28 mol) of triethylamine, 22.8 g. (0.38 mol of carbonyl sulfide, 30.8 g. (0.28 mol) of chloromethyl ethyl sulfide and 200 cc. of tert. butyl alcohol solvent were employed, there was obtained 43.8 g. (75.5% yield) of ethylmercaptomethyl N,N-diethylthiolcarbamate, B.P. (10 mm.) 149.5–150° C., $n_D^{30}$ 1.5193.

*Analysis.*—Calculated for $C_8H_{17}NOS_2$: N=6.76%. Found: N=6.52%.

*Example XXVI (R-2821).*—When the general procedure of Example XIV was repeated except that 20.2 g. (0.20 mol) of di-n-propylamine, 20.2 g. (0.20 mol) of triethylamine, 16 g. (0.27 mol) of carbonyl sulfide, 22.1 g. (0.20 mol) of chloromethyl ethyl sulfide and 150 cc. of tert. butyl alcohol were employed, there was obtained 32.6 g. (69.4% yield) of ethylmercaptomethyl N,N-di-n-propylthiolcarbamate, B.P. (10 mm.) 163.5–164.0° C., $n_D^{30}$ 1.5105.

*Analysis.*—Calculated for $C_{10}H_{21}NOS_2$: N=5.95%. Found: N=5.76%.

*Example XXVII (R–2823).*—When the general procedure of Example XIV was repeated except that 20.2 g. (0.20 mol) of N-ethyl-n-butylamine, 20.2 g. (0.20 mol) of triethylamine, 16 g. (0.27 mol) of carbonyl sulfide, 22.1 g. (0.20 mol) of chloromethyl ethyl sulfide and 150 cc. of tert. butyl alcohol were employed, there was obtained 33.1 g. (70.4% yield) of ethylmercaptomethyl N-ethyl-N-n-butylthiolcarbamate, B.P. (10 mm.) 164.5–166.0° C., $n_D^{30}$ 1.5104.

*Analysis.*—Calculated for $C_{10}H_{21}NOS_2$: N=5.95%. Found: N=5.85%.

*Example XXVIII (R–2824).*—When the general procedure of Example XIV was repeated except that 19.4 g. (0.20 mol) of diallylamine, 20.2 g. (0.20 mol) of triethylamine, 16 g. (0.27 mol) of carbonyl sulfide, 22.1 g. (0.20 mol) of chloromethyl ethyl sulfide and 150 cc. of tert. butyl alcohol were employed, there was obtained 29.8 g. (64.5% yield) of ethylmercaptomethyl N,N-diallylthiolcarbamate, B.P. (10 mm.) 164.0–164.1° C., $n_D^{30}$ 1.5330.

*Analysis.*—Calculated for $C_{10}H_{17}NOS_2$: N=6.05%. Found: N=6.04%.

*Example XXIX (R–2826).*—When the general procedure of Example XIV was repeated except that 9.9 g. (0.10 mol) of N-allyl-n-propylamine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained 16.0 g. (68.6% yield) of ethylmercaptomethyl N-allyl-N-n-propylthiolcarbamate, B.P. (10 mm.) 162.5–163.0° C., $n_D^{30}$ 1.5216.

*Analysis.*—Calculated for $C_{10}H_{19}NOS_2$: N=6.00%. Found: N=5.83%.

*Example XXX (R–2829).*—When the general procedure of Example XIV was repeated except that 9.9 g. (0.10 mol) of N-methallylethylamine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained 16.0 g. (68.6% yield) of ethylmercaptomethyl N-methallyl-N-ethylthiolcarbamate, B.P. (10 mm.) 160.0–160.5° C., $n_D^{30}$ 1.5231.

*Analysis.*—Calculated for $C_{10}H_{19}NOS_2$: N=6.00%. Found: N=5.89%.

*Example XXXI (R–2832).*—When the general procedure of Example XIV was repeated except that 11.1 g. (0.10 mol) of N-methallyl-allyl amine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained 16.5 g. (67.4% yield) of ethylmercaptomethyl N-methallyl-N-allylthiolcarbamate, B.P. (10 mm.) 166.5–167.0° C., $n_D^{30}$ 1.5285.

*Analysis.*—Calculated for $C_{11}H_{19}NOS_2$: N=5.71%. Found: N=5.51%.

*Example XXXII (R–2837).*—When the general procedure of Example XIV was repeated except that 12.0 g. (0.10 mol) of N-3-chloroallylethylamine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained as a residue 20.4 g. (80.4% yield) of ethylmercaptomethyl N-3-chloroallyl-N-ethylthiolcarbamate, $n_D^{30}$ 1.5416.

*Analysis.*—Calculated for $C_9H_{16}ClNOS_2$: N=5.52%; Cl=13.97%. Found: N=5.35%; Cl=13.70%.

*Example XXXIII (R–2838).*—When the general procedure of Example XIV was repeated except that 8.7 g. (0.10 mol) of N-methyl-n-butylamine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained 14.8 g. (66.9% yield) of ethylmercaptomethyl N-methyl-N-n-butylthiolcarbamate, B.P. (10 mm.) 161.5–162.0° C., $n_D^{30}$ 1.5155.

*Analysis.*—Calculated for $C_9H_{19}NOS_2$: N=6.33%. Found: N=6.20%.

*Example XXXIV (R–2843).*—When the general procedure of Example XIV was repeated except that 9.9 g. (0.10 mol) of 2-methylpiperidine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained as a residue 15.4 g. (66.1% yield) of ethylmercaptomethyl 1-(2-methyl)piperidinecarbothiolate, $n_D^{30}$ 1.5450.

*Analysis.*—Calculated for $C_{10}H_{19}NOS_2$: N=6.00%. Found: N=6.31%.

*Example XXXV (R–2844).*—When the general procedure of Example XIV was repeated except that 12.7 g. (0.10 mol) of N-ethylcyclohexylamine, 10.1 g. (0.10 mol) of triethylamine, 10 g. (0.17 mol) of carbonyl sulfide, 11.1 g. (0.10 mol) of chloromethyl ethyl sulfide and 150 cc. of tert. butyl alcohol were employed, there was obtained as a residue 20.1 g. (77.0% yield) of ethylmercaptomethyl N-ethyl-N-cyclohexylthiolcarbamate, $n_D^{30}$ 1.5259.

*Analysis.*—Calculated for $C_{12}H_{23}NOS_2$: N=5.36%. Found: N=4.89%.

*Example XXXVI (R–2850).*—The general procedure of Example XIV was repeated except that 5.0 g. (0.068 mol) of diethylamine, 6.8 g. (0.068 mol) of triethylamine, 6.9 g. (0.115 mol) of carbonyl sulfide and 125 cc. of tert. butyl alcohol were used. The reaction mixture was then heated to 50° C. and 11.5 g. (0.074 mol) of 2-bromoethyl methyl sulfide was rapidly added. After several minutes, triethylammonium bromide began to precipitate from the solution. The reaction mixture was kept at 50° C. for 20 hours, 100 cc. of solvent was distilled and the reaction mixture was then worked up in the usual manner. There was obtained 14.1 g. (55.3% yield) of 2-methylmercaptoethyl N,N-diethylthiolcarbamate, B.P. (10 mm.) 149.5–150.0° C., $n_D^{30}$ 1.5219.

*Analysis.*—Calculated for $C_8H_{17}NOS_2$: N=6.76%. Found: N=6.72%.

*Example XXXVII (R–2854).*—When the general procedure of Example XXXVI was employed except that 6.8 g. (0.068 mol) of N-ethyl-n-butylamine, 6.8 g. (0.068 mol) of triethylamine, 6.9 g. (0.115 mol) of carbonyl sulfide, 11.5 g. (0.074 mol) of 2-bromoethyl methyl sulfide and 125 cc. of tert. butyl alcohol were employed, there was obtained 10.4 g. (65.0% yield) of 2-methylmercaptoethyl N-ethyl-N-n-butylthiolcarbamate, B.P. (10 mm.) 168.0–169.0° C., $n_D^{30}$ 1.5126.

*Analysis.*—Calculated for $C_{10}H_{21}NOS_2$: N=5.95%. Found: N=5.91%.

*Example XXXVIII (R–2855).*—When the general procedure of Example XXXVI was employed except that 7.2 g. (0.074 mol) of diallylamine, 7.5 g. (0.074 mol) of triethylamine, 6.9 g. (0.115 mol) of carbonyl sulfide, 11.5 g. (0.074 mol) of 2-bromoethyl methyl sulfide and 125 cc. of tert. butyl alcohol were employed, there was obtained 11.4 g. (72.6% yield) of 2-methylmercaptoethyl N,N-diallylthiolcarbamate, B.P. (10 mm.) 168.5–169.0° C., $n_D^{30}$ 1.5353.

*Analysis.*—Calculated for $C_{10}H_{17}NOS_2$: N=6.05%. Found: N=6.09%.

*Example XXXIX (R-2857).*—When the general procedure of Example XXXVI was employed except that 6.7 g. (0.07 mol) of N-allyl-n-propylamine, 6.8 g. (0.07 mol) of triethylamine, 6.9 g. (0.12 mol) of carbonyl sulfide, 10.5 g. (0.07 mol) of 2-bromoethyl methyl sulfide and 125 cc. of tert. butyl alcohol were employed, there was obtained 9.4 g. (59.5% yield) of 2-methylmercaptoethyl N-allyl-N-n-propylthiolcarbamate, B.P. (10 mm.) 166.5–167.5° C., $n_D^{30}$ 1.5238.

*Analysis.*—Calculated for $C_{10}H_{19}NOS_2$: N=6.00%. Found: N=6.08%.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10, based on the seeds which germinated. Thus, 100–10 indicates normal germination and normal growth.

| Compound | Oats | | Cucumbers | | Radish | |
|---|---|---|---|---|---|---|
| | Germ. | Growth | Germ. | Growth | Germ. | Growth |
| R-2264 | 0 | | 0 | | 0 | |
| R-2265 | 0 | | 0 | | 10 | 3 |
| R-2340 | 0 | | 25 | 0+ | 50 | 1 |
| R-2341 | 0 | | 25 | 3 | 75 | 4 |
| R-2266 | 0 | | 0 | | 10 | 3 |
| R-2267 | 0 | | 0 | | 25 | 2 |
| R-2296 | 0 | | 25 | 3 | 75 | 3 |
| R-2323 | 0 | | 0 | | 15 | 2 |
| R-2324 | 0 | | 0 | | 0 | |
| R-2326 | 0 | | 0 | | 0 | |
| R-2328 | 0 | | 0 | | 15 | 3 |
| R-2329 | 0 | | 15 | 2 | 50 | 2 |
| R-2330 | 0 | | 25 | 3 | 15 | 2 |
| R-2333 | 0 | | 15 | 2 | 0 | |
| R-2336 | 0 | | 0 | | 0 | |
| R-2337 | 0 | | 0 | | 25 | 1 |
| R-2338 | 0 | | 0 | | 0 | |
| R-2339 | 0 | | 0 | | 25 | 0+ |
| R-2342 | 0 | | 25 | 2 | 0 | |
| R-2343 | 0 | | 15 | 1 | 0 | |
| R-2344 | 0 | | 15 | 1 | 25 | 2 |
| R-2345 | 0 | | 0 | | 0 | |
| R-2346 | 0 | | 0 | | 0 | |
| R-2347 | 0 | | 0 | | 0 | |
| R-2816 | 0 | | 0 | | 0 | |
| R-2821 | 0 | | 0 | | 25 | 4 |
| R-2823 | 0 | | 0 | | 50 | 4 |
| R-2824 | 0 | | 0 | | 25 | 3 |
| R-2826 | 0 | | 15 | 1 | 25 | 2 |
| R-2829 | 0 | | 0 | | 15 | 1 |
| R-2832 | 0 | | 0 | | 75 | 7 |
| R-2837 | 15 | 1 | 25 | 3 | 25 | 2 |
| R-2838 | 0 | | 0 | | 25 | 1 |
| R-2843 | 0 | | 0 | | 25 | 2 |
| R-2844 | 25 | 0+ | 15 | 1 | 100 | 9 |
| R-2850 | 0 | | 0 | | 0 | |
| R-2854 | 0 | | 0 | | 75 | 5 |
| R-2855 | 0 | | 0 | | 15 | 1 |
| R-2857 | 0 | | 0 | | 25 | 2 |

The above tests were then repeated using application rates of 10 and 40 pounds per acre with the following results:

| Compound | Lbs./A. | Peas | | Corn | | Radish | | Rye | | Cucumber | |
|---|---|---|---|---|---|---|---|---|---|---|---|
| | | Ge. | Gr. | Ge. | Gr. | Ge. | Gr. | Ge. | Gr. | Ge. | Gr. |
| R-2264 | 10 | 100 | 3 | 100 | 10 | 100 | 10 | 0 | | 25 | 6 |
| | 40 | 75 | 1 | 100 | 4 | 100 | 10 | 0 | | 100 | 10 |
| R-2265 | 10 | 100 | 1 | 100 | 6 | 100 | 10 | 0 | | 25 | 5 |
| | 40 | 100 | 1 | 100 | 10 | 100 | 10 | 0 | | 100 | 10 |
| R-2340 | 10 | 100 | 10 | 100 | 10 | 100 | 10 | 100 | 10 | 100 | 10 |
| | 40 | 100 | 10 | 100 | 9 | 100 | 10 | 50 | 3 | 100 | 6 |
| R-2341 | 10 | 100 | 6 | 100 | 10 | 100 | 10 | 100 | 0+ | 100 | 10 |
| | 40 | 100 | 5 | 100 | 10 | 100 | 10 | 25 | 0+ | 100 | 4 |
| R-2266 | 10 | 100 | 8 | 100 | 9 | 100 | 10 | 5 | 0+ | 100 | 10 |
| | 40 | 100 | 4 | 100 | 6 | 100 | 10 | 0 | | 25 | 4 |
| R-2267 | 10 | 100 | 5 | 100 | 10 | 100 | 10 | 0 | | 100 | 10 |
| | 40 | 100 | 3 | 75 | 4 | 100 | 10 | 0 | | 5 | 1 |
| R-2296 | 10 | 100 | 9 | 100 | 10 | 100 | 10 | 0 | | 100 | 10 |
| | 40 | 50 | 4 | 100 | 10 | 100 | 10 | 0 | | 100 | 10 |
| R-2323 | 10 | 100 | 4 | 100 | 10 | 100 | 10 | 0 | | 100 | 8 |
| | 40 | 100 | 2 | 100 | 8 | 100 | 10 | 0 | | 100 | 6 |
| R-2324 | 10 | 100 | 4 | 100 | 10 | 100 | 10 | 0 | | 100 | 6 |
| | 40 | 100 | 1 | 100 | 6 | 100 | 10 | 0 | | 50 | 4 |
| R-2326 | 10 | 100 | 4 | 100 | 10 | 100 | 10 | 0 | | 100 | 7 |
| | 40 | 100 | 1 | 100 | 10 | 100 | 10 | 0 | | 100 | 3 |
| R-2328 | 10 | 100 | 4 | 100 | 10 | 100 | 10 | 0 | | 100 | 10 |
| | 40 | 75 | 3 | 100 | 10 | 100 | 10 | 0 | | 50 | 4 |
| R-2329 | 10 | 100 | 6 | 100 | 10 | 100 | 10 | 25 | 0+ | 100 | 10 |
| | 40 | 100 | 4 | 100 | 9 | 100 | 7 | 0 | | 100 | 3 |
| R-2330 | 10 | 100 | 6 | 100 | 10 | 100 | 10 | 50 | 0+ | 100 | 10 |
| | 40 | 100 | 3 | 100 | 10 | 100 | 8 | 0 | | 100 | 3 |
| R-2333 | 10 | 100 | 4 | 100 | 10 | 100 | 10 | 0 | | 100 | 8 |
| | 40 | 100 | 2 | 100 | 8 | 100 | 7 | 0 | | 50 | 2 |
| R-2336 | 10 | 100 | 3 | 100 | 10 | 100 | 10 | 0 | | 100 | 5 |
| | 40 | 75 | 1 | 100 | 10 | 100 | 10 | 0 | | 100 | 10 |
| R-2337 | 10 | 100 | 5 | 100 | 10 | 100 | 10 | 0 | | 100 | 10 |
| | 40 | 100 | 3 | 100 | 10 | 100 | 10 | 0 | | 75 | 5 |
| R-2338 | 10 | 100 | 5 | 100 | 10 | 100 | 10 | 100 | 0+ | 100 | 10 |
| | 40 | 100 | 5 | 100 | 10 | 100 | 10 | 100 | 0+ | 100 | 8 |
| R-2339 | 10 | 100 | 7 | 100 | 10 | 100 | 10 | 100 | 0+ | 100 | 10 |
| | 40 | 100 | 4 | 100 | 8 | 100 | 10 | 0 | | 50 | 7 |
| R-2342 | 10 | 100 | 10 | 100 | 10 | 100 | 10 | 100 | 0+ | 100 | 10 |
| | 40 | 100 | 5 | 100 | 10 | 100 | 10 | 25 | 0+ | 100 | 6 |
| R-2343 | 10 | 100 | 10 | 100 | 10 | 100 | 10 | 25 | 0+ | 100 | 10 |
| | 40 | 100 | 4 | 100 | 8 | 100 | 10 | 0 | | 50 | 4 |
| R-2344 | 10 | 100 | 8 | 100 | 10 | 100 | 10 | 25 | 0+ | 100 | 10 |
| | 40 | 50 | 2 | 100 | 6 | 75 | 6 | 0 | | 50 | 3 |
| R-2345 | 10 | 100 | 5 | 100 | 10 | 100 | 10 | 25 | 0+ | 100 | 9 |
| | 40 | 100 | 3 | 100 | 4 | 100 | 6 | 0 | | 100 | 4 |
| R-2346 | 10 | 100 | 2 | 100 | 9 | 100 | 6 | 0 | | 100 | 7 |
| | 40 | 25 | 0+ | 100 | 4 | 100 | 6 | 0 | | 15 | 0+ |
| R-2347 | 10 | 100 | 8 | 100 | 8 | 100 | 6 | 0 | | 100 | 6 |
| | 40 | 75 | 2 | 100 | 2 | 100 | 6 | 0 | | 50 | 3 |
| R-2816 | 10 | 100 | 7 | 100 | 10 | 100 | 10 | 100 | 0+ | 100 | 7 |
| | 40 | 100 | 3 | 100 | 9 | 100 | 8 | 0 | | 75 | 5 |
| R-2821 | 10 | 100 | 6 | 100 | 10 | 100 | 9 | 100 | 2 | 100 | 10 |
| | 40 | 100 | 1 | 100 | 8 | 100 | 8 | 0 | | 30 | 3 |

| Compound | Lbs./A. | Peas | | Corn | | Radish | | Rye | | Cucumber | |
|---|---|---|---|---|---|---|---|---|---|---|---|
| | | Ge. | Gr. | Ge. | Gr. | Ge. | Gr. | Ge. | Gr. | Ge. | Gr. |
| R-2823 | 10 | 100 | 9 | 100 | 10 | 100 | 10 | 50 | 5 | 100 | 10 |
|  | 40 | 100 | 3 | 100 | 7 | 100 | 6 | 0 | ---- | 100 | 3 |
| R-2824 | 10 | 100 | 9 | 100 | 10 | 100 | 10 | 100 | 3 | 100 | 8 |
|  | 40 | 100 | 3 | 100 | 8 | 100 | 7 | 0 | ---- | 0 | ---- |
| R-2826 | 10 | 100 | 7 | 100 | 10 | 100 | 10 | 100 | 0+ | 100 | 9 |
|  | 40 | 100 | 3 | 100 | 8 | 100 | 5 | 0 | ---- | 0 | ---- |
| R-2829 | 10 | 100 | 4 | 100 | 9 | 100 | 9 | 100 | 1 | 100 | 6 |
|  | 40 | 100 | 2 | 100 | 7 | 100 | 7 | 75 | 0+ | 0 | ---- |
| R-2832 | 10 | 70 | 6 | 100 | 10 | 100 | 9 | 100 | 0+ | 100 | 7 |
|  | 40 | 100 | 2 | 100 | 9 | 100 | 7 | 20 | 0+ | 0 | ---- |
| R-2837 | 10 | 100 | 9 | 100 | 7 | 100 | 10 | 100 | 3 | 100 | 10 |
|  | 40 | 100 | 6 | 100 | 10 | 100 | 8 | 80 | 0+ | 100 | 9 |
| R-2838 | 10 | 100 | 8 | 100 | 9 | 100 | 10 | 100 | 0+ | 100 | 9 |
|  | 40 | 100 | 4 | 100 | 7 | 100 | 7 | 70 | 0+ | 100 | 5 |
| R-2843 | 10 | 100 | 4 | 100 | 10 | 100 | 10 | 100 | 0+ | 100 | 7 |
|  | 40 | 100 | 1 | 100 | 7 | 100 | 10 | 80 | 0+ | 100 | 4 |
| R-2844 | 10 | 100 | 8 | 100 | 10 | 100 | 10 | 100 | 1 | 100 | 10 |
|  | 40 | 100 | 7 | 100 | 9 | 100 | 10 | 100 | 0+ | 100 | 6 |
| R-2850 | 10 | 100 | 5 | 100 | 10 | 100 | 10 | 50 | 0+ | 100 | 9 |
|  | 40 | 100 | 1 | 100 | 7 | 100 | 6 | 10 | 0+ | 100 | 6 |
| R-2854 | 10 | 100 | 7 | 100 | 10 | 100 | 10 | 100 | 0+ | 100 | 10 |
|  | 40 | 100 | 3 | 100 | 5 | 100 | 6 | 0 | ---- | 100 | 3 |
| R-2855 | 10 | 100 | 3 | 100 | 8 | 100 | 10 | 100 | 0+ | 100 | 10 |
|  | 40 | 100 | 1 | 100 | 8 | 100 | 6 | 20 | 0+ | 100 | 4 |
| R-2857 | 10 | 100 | 2 | 100 | 10 | 100 | 10 | 100 | 0+ | 100 | 10 |
|  | 40 | 100 | 1 | 100 | 7 | 100 | 6 | 0 | ---- | 35 | 1 |

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:

1. The method of combating weeds comprising: applying to the soil a phytotoxic amount of a compound having the formula

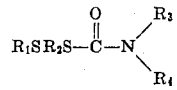

wherein $R_1$ is a lower alkyl radical, $R_2$ is selected from the group consisting of a methylene radical and a lower polymethylene radical, and wherein $R_3$ and $R_4$ are selected from the group consisting of one (1) lower alkyl, cyclohexyl, lower alkenyl and lower haloalkenyl radicals: (2) a single tetramethylene group bonded through each of its terminal carbon atoms to the nitrogen atom of the thiolcarbamate; and (3) a single pentamethylene group, said pentamethylene group being selected from the group consisting of methyl substituted and unsubstituted pentamethylene bonded through each of its terminal carbon atoms to the nitrogen atom of the thiolcarbamate.

2. The process of claim 1 wherein the compound is applied in a narrow band to a row crop at a rate of application from about one-half to about twenty pounds per acre of area actually treated.

3. The method of combating weeds comprising: applying to the soil a phytotoxic amount of methylmercaptomethyl N,N-diethylthiolcarbamate.

4. The method of combating weeds comprising: applying to the soil a phytotoxic amount of methylmercaptomethyl N,N-di-n-propylthiolcarbamate.

5. The method of combating weeds comprising: applying to the soil a phytotoxic amount of methylmercaptomethyl N-allyl-N-ethylthiolcarbamate.

6. The method of combating weeds comprising: applying to the soil a phytotoxic amount of methylmercaptomethyl N-methallyl-N-ethylthiolcarbamate.

7. The method of combating weeds comprising: applying to the soil a phytotoxic amount of methylmercaptomethyl 1-(2-methyl)-piperidinecarbothiolate.

References Cited in the file of this patent

UNITED STATES PATENTS

| 2,197,574 | Watt | Apr. 16, 1940 |
| 2,396,789 | Hunt | Mar. 19, 1946 |
| 2,562,011 | Baumgartner | July 24, 1951 |
| 2,642,451 | Weiyland | Jan. 16, 1953 |
| 2,687,348 | Kosmin | Aug. 24, 1954 |
| 2,690,440 | Himel | Sept. 28, 1954 |
| 2,842,554 | Sullivan | July 8, 1958 |
| 2,883,318 | Bras | Apr. 21, 1959 |

FOREIGN PATENTS

| 205,460 | Australia | Mar. 8, 1956 |